United States Patent [19]

Ehrenfried et al.

[11] 3,792,407

[45] Feb. 12, 1974

[54] CHANNEL MOUNTED LEVEL SENSOR

[75] Inventors: Albert D. Ehrenfried; Norton T. Pierce, both of Concord, Mass.; Mason G. Ide, Nashua, N.H.

[73] Assignee: Metritape, Inc., West Concord, Mass.

[22] Filed: Sept. 15, 1971

[21] Appl. No.: 180,608

[52] U.S. Cl. .................................... 338/13, 73/301
[51] Int. Cl. ........................................... G01f 23/00
[58] Field of Search.... 73/301, 299; 338/13, 68, 69; 174/110 R

[56] References Cited

UNITED STATES PATENTS

| | | | |
|---|---|---|---|
| 1,713,793 | 7/1955 | Anderson | 73/301 |
| 3,153,342 | 10/1964 | Pierce | 73/301 |
| 3,290,938 | 12/1966 | Miller | 73/299 |

*Primary Examiner*—Richard C. Queisser
*Assistant Examiner*—Denis E. Corr

[57] ABSTRACT

A channel mount for an elongated level sensor which provides a rugged mechanical housing while not detracting from sensor sensitivity. An elongated spatially continuous sensor is supported within a channel-shaped mount which includes a planar facing closely adjacent the sensitive surface of the sensor. The facing is movably disposed with respect to the mount to permit transverse deformation for sensor actuation.

8 Claims, 14 Drawing Figures

INVENTORS
ALBERT D. EHRENFRIED
NORTON T. PIERCE
BY MASON G. IDE

Weingarten, Maxham & Schurgin
ATTORNEYS

INVENTORS
ALBERT D. EHRENFRIED
NORTON T. PIERCE
MASON G. IDE
BY
Weingarten, Maxham & Schurgin
ATTORNEYS

CHANNEL MOUNTED LEVEL SENSOR

FIELD OF THE INVENTION

This invention relates to elongated continuous level sensors and more particularly to channel mounting means therefor and cooperative therewith for providing a rugged structure without loss of actuation sensitivity.

BACKGROUND OF THE INVENTION

An elongated level sensor is described in U.S. Pat. No. 3,153,342, assigned to the assignee of the present invention, which is adapted for suspension within a tank or vessel containing material the level of which is to be monitored. Such sensors, sold under the trademark METRITAPE, include an elongated electrically conductive base strip having a resistance wire helically wound along the length of the base strip and insulated therefrom exept along a window portion on one face of the base strip. A jacket formed of one or more layers of material is provided around the inner electrical system to isolate the sensor from the working environment. In operation, the sensor is suspended usually from a mounting at the top of a vessel within a fluent material to be monitored, and the conductive base strip and helical resistance wire are connected in a rheostat configuration to resistance or voltage measuring circuitry calibrated to provide an output indication of material level. The surrounding pressure of the fluent material causes those turns of the helical wire within the material mass to be urged into engagement with the underlying base strip in the region of the uninsulated window. A variable resistance is thereby provided which is a direct measure of material level and which is utilized to provide an output indication of level, or to provide control signals for automatic control of material level.

The elongated level sensor described above is directly actuated by the force of the surrounding fluent material in which the sensor is disposed. Under actual operating conditions the sensors are exposed to often extremely hostile environments and are subject to damaging conditions by reason of the unusual behavior of dry fluent materials. For example, a sensor having a length of 100 feet can experience continuous vertical downward forces in excess of 200 pounds as dry fluent material moves downward in a bin during outflow therefrom. In addition, dry bulk materials do not flow with smooth and continuous motion but rather move with intermittent stick-slip motion, in which the stored material is initially undermined by material leaving the bottom outlet of a bin with the upper material then falling as a mass to fill the undermined void. With the above described sensor entrapped in this large material mass, short duration transient forces, which can amount to several thousand pounds, are momentarily applied to the outer surface of the sensor.

A less violent but equally severe action within a dry bulk material involves the slow settling or compaction of compressible dry materials stored in bins over extended periods of time. The resultant action of the material to slowly consolidate and compact imparts very slow long duration pulldown forces to the outer sensor surface which can result in the slow stretching and slippage of outer sensor jackets as the settling action continues. The elongated sensor must therefore be of sufficient strength to withstand the forces encountered in operation. At the same time however the sensor is also required to have a very high actuation sensitivity for providing an output indication of material level. Despite the very large material masses in a bin of dry bulk material, these materials are sufficiently imperfect transmitters of force and pressure, by reason of absorption of forces and pressure due to interparticle friction, that the sensor requires a very low actuation sensitivity typically as low as 0.2–0.5 psi in order to operate reliably and accurately.

The requirement of high actuation sensitivity and high structural strength are contradictory and it is an object of the present invention to achieve this demanding combination of actuation sensitivity, high tensile strength and high resistance to abrasion and/or corrosion. It is also essential that the elongated sensor construction be relatively insensitive to bending and curvature when disposed within a material mass, and also that the sensor structure despite its extremely high physical strength be easily coiled to allow the packaging and shipment of long sensors to a site for installation. The sensor must not suffer damage or permanent alteration in properties by such coiling and handling.

SUMMARY OF THE INVENTION

In accordance with the present invention, a channel mounting means is provided for and is cooperative with an elongated spatially continuous sensor of the Metritape type to achieve a desired combination of actuation sensitivity and mechanical strength. The elongated sensor is supported within a channel shaped mount which is cooperative with the sensor to provide enhanced mechanical protection for the sensor without loss of sensitivity to surrounding pressure. By use of the invention the overall sensor structure can be of improved tensile strength and abrasion resistance for those environments requiring the same, and can be made relatively stiff for better control of sensor position in agitated or other materials in which forces are present which could move the sensor within the storage vessel. Moreover, in those instances where the sensor is mounted to supporting surfaces the novel channel mount provides a means for readily attaching the sensor to such surfaces without affecting sensor operation.

The invention provides a relatively massive and rugged protective shell for the back and sides of the elongated sensor and a relatively light compliant layer over the sensitive window area of the sensor. As a particular feature of the invention, the protective channel and the facing thereof positioned in alignment with the sensor window are independently selected to suit specific operating system requirements. The invention thus provides a ready means for implementing a modularized level monitoring system by combining an inner sensor with a protective channel and a facing to serve particular application requirements. The invention also provides a sensor structure which can be readily coiled and uncoiled without damage for shipment and installation.

DESCRIPTION OF THE DRAWINGS

The invention will be more fully understood from the following detailed description taken in conjunction with the accompanying drawings, in which.

DETAILED DESCRIPTION OF THE INVENTION

Figure 2:
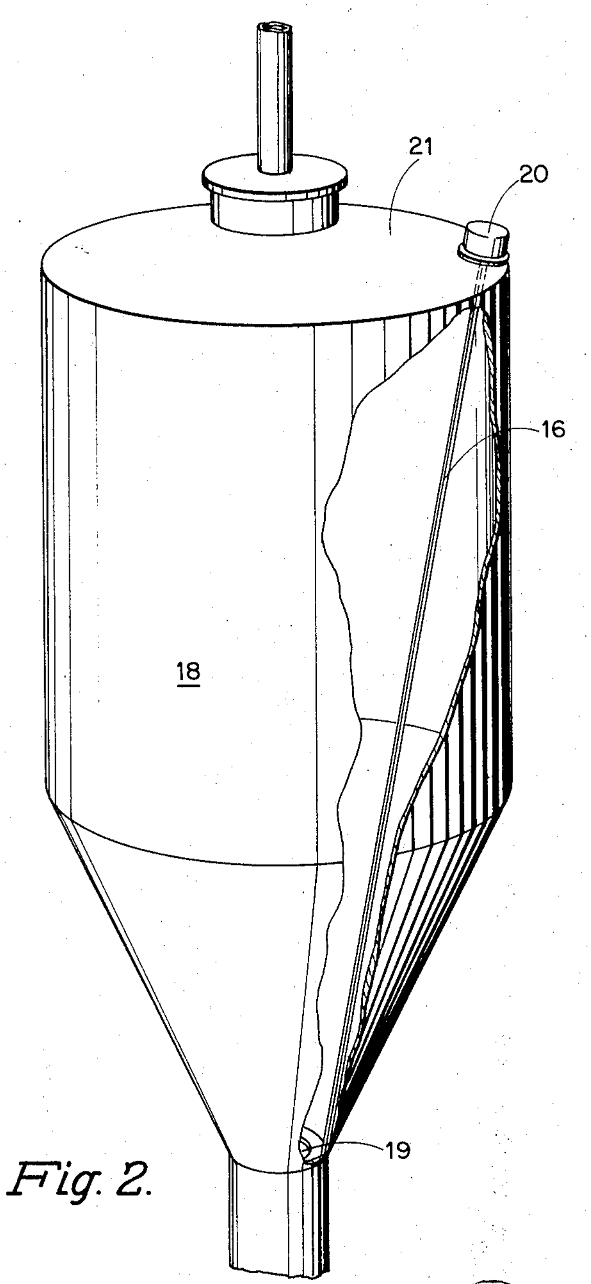
FIG. 2 is a cutaway pictorial view of an alternative sensor mounting configuration.
Figure 1:
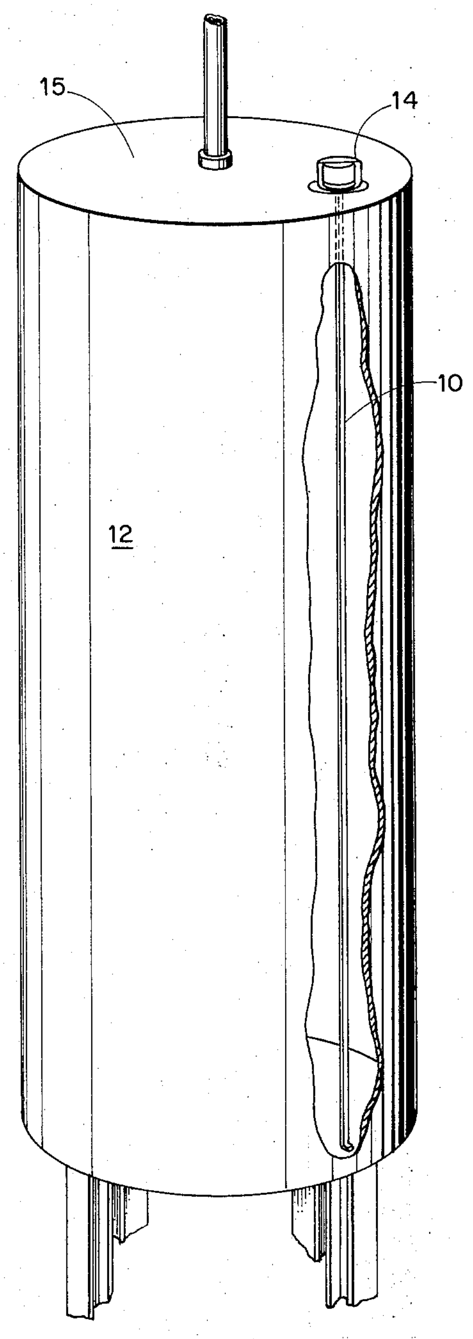
FIG. 1 is a cutaway pictorial view of a level sensor in a typical installation within a storage vessel.

A typical installation of an elongated level sensor according to the invention is depicted in FIG. 1 wherein a sensor 10 of the Metritape type, described in the above U.S. Pat. No. 3,153,342, is part of a rigid structure to be described and supported in vertical disposition within a fluent material storage vessel 12. The sensor structure is suspended from a mounting assembly 14 provided on the roof 15 of vessel 12 and can be attached to the floor of the vessel or can be in free hanging disposition therein. An alternative mounting arrangement is shown in FIG. 2 wherein the sensor 16 is disposed angularly within the storage vessel 18 with the lower end of the sensor secured to the vessel near the outlet port 19, and the upper end secured via mounting assembly 20 to the roof 21 of the vessel. The sensor is operative in response to the surrounding pressure of the fluent material within the storage vessel to provide an output resistance or voltage which is a direct measure of material level. The output signal can be employed with a suitable indicator to provide a visual indication of material level, and can also be employed with control circuitry to provide high and low level alarms and to control automatic draining and filling operations to maintain predermined level conditions within a storage vessel. As will become apparent, the mounting of the sensor within a cooperative channel allows improved positioning of the sensor in a moving or agitated material mass and provides a means for clamping a sensor in a fixed position, as in FIG. 2, without material affect on sensor sensitivity.

Figure 3:
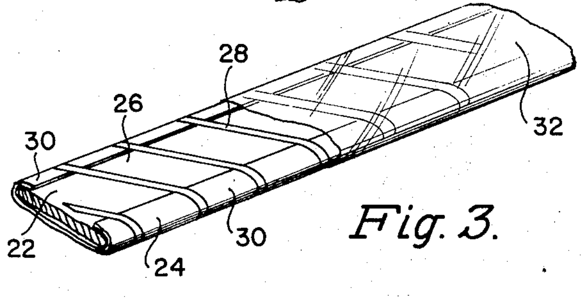
FIG. 3 is a cutaway pictorial view of a level sensor of the type useful in the present invention.

The sensor itself, which is the subject of the above U.S. Pat. No. 3,153,342, need only be described herein to an extent sufficient for an understanding of the present invention. Referring to FIG. 3, there is shown a conductive base strip 22 having a layer of insulating material 24 which surrounds the base strip except for a window portion 26 which extends along one surface of the sensor. A wire of electrically resistive material 28 and typically of flat ribbon configuration, is helically wound around insulating layer 24 and is maintained in precise spaced relationship with the uninsulated window portion 26 by operation of the shoulder portions 30 of insulating layer 24. In the absence of pressure applied to the sensor, the resistance winding 28 remains spaced from the underlying base strip 22. In the presence of surrounding pressure, however, the turns of winding 28 subject to such pressure are urged into engagement with the underlying base strip 22 thereby shorting out the resistance winding at these points and causing a variation in sensor resistance. The sensor may be electrically connected as a rheostat by connection to base strip 22 and one end of resistance wire 28 to provide a variable output resistance, or as a potentiometer by connection to both ends of resistance wire 28 and base strip 22 to provide a variable output voltage. The output of either resistance or voltage form is a direct measure of the material level providing the surrounding actuating pressure to the sensor.

A flexible jacket structure 32 is provided around the sensor to isolate the electrical system from the working environment and prevent the transmssion of contamination therein. It will be appreciated that the jacket must be sufficiently pliant to transmit an actuating force to the sensor while also providing proper mechanical protection. As discussed hereinabove, the forces often encountered during sensor operation, such as produced by a moving mass of fluent material within a storage vessel, can be quite severe and which would necessitate a jacket structure to provide the necessary mechanical protection but of a construction which would detract from the necessary sensitivity for sensor activation. It is the province of the present invention to provide a channel mounting means cooperative with a sensor which achieves mechanical protection of the sensor even in hostile environments without materially detracting from sensor sensitivity.

Figure 4:
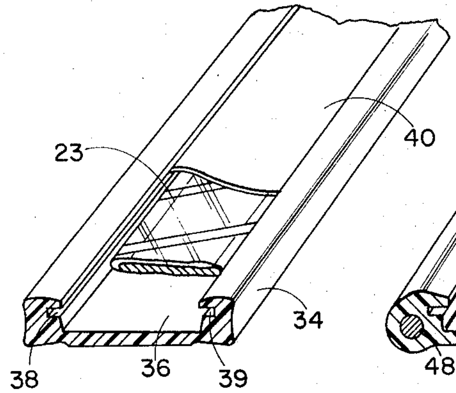
FIG. 4 is a cutaway pictorial view of a channel mounted sensor according to the invention.

The invention is depicted in one preferred embodiment in FIG. 4 which shows an elongated extruded member 34 formed of a plastic material such as CYCOLAC and operative to serve as a high strength member in surrounding relationship to a sensor 23 disposed therein to withstand high tensile and abrasion forces encountered during sensor operation and to provide positive retention of the sensor without false actuation. The member 34 is also operative to support a facing strip 40 in planar confronting relation to the actuable side of sensor 23 to serve as a sensitive diaphragm for the accurate transmission of forces due to surrounding pressure for sensor actuation. Member 34 bears a precise relationship to the associated sensors 23 and facing 40 to provide improved sensor operation in the presence of a hostile environment. More particularly, member 34 includes a channel 36 provided along the length thereof and being of a width slightly larger than the width of sensor 23 to permit the disposition of the sensor therein for sliding relationship with respect to member 34. The depth of channel 36 is selected to provide disposition of the sensor therein with the sensor base strip at or close to the coiling axis of member 34 for ease of coiling and uncoiling of the overall structure.

A pair of confronting grooves 38 and 39 are provided along the length of member 34 for receiving and supporting facing strip 40 therein. The confronting grooves are positioned with respect to channel 36 to permit disposition of facing 40 in touching or slightly spaced relation jacket of sensor 23. The grooves 38 and 39 are sized to retain facing 40 to prevent snap-out from member 34 and to allow unimpeded diaphragm action. The distance D between the respective extremities of grooves 38 and 39 is greater than the width of facing 40 to insure the planar disposition of the facing within the associated grooves. A lip portion 41 is provided as illustrated on respective opposite edges of the upstanding portions of member 34 defining channel 36. These lip portions extend inwardly toward each other and define a distance therebetween less than the width of channel 36 to provide positive retention of sensor 23 disposed within the channel. This lip construction is especially useful to prevent accidental separation of the sensor from its associated channel during shipment or installation. To assemble the overall structure, sensor 23 is snapped into channel 36 or can be slidably inserted lengthwise from an end of the channel.

The facing 40 can be of a metal or plastic material or a combination thereof to provide the necessary transmission of actuating force to the sensor as well as providing intended structural characteristics. The facing is preferably disposed at about the center of grooves 38 and 39 which are of a thickness greater than that of the facing to permit buckling of the facing during coiling of the sensor structure. When coiled, the facing 40 will tend to assume an undulated configuration within grooves 38 and 39. A heavier facing usually should be freely disposed in the mounting grooves to permit coiling, while lighter facings can be captured in the mounting grooves by a cement or other means. The facing 40 can be for example a metal such as stainless steel or a plastic material such as Teflon or polyethylene to suit particular requirements for abrasion resistance, corrosion resistance, temperature while still providing sensitive diaphragm operation for sensor actuation. A combination of materials can also be employed to provide a facing of specified characteristics. For example, a layer of polyurethane can be formed on a surface of a stainless steel strip to produce a composite material which resists creasing for ease of installation in member 34 and which permits improved coilability. The plastic on the outside surface of the assembled sensor structure also minimizes the scoring of the steel facing by sharp material particles.

Figure 7:
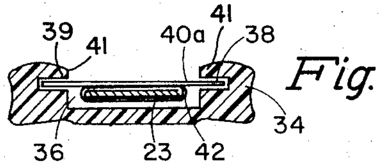
FIGS. 7, 8 and 9 are cutaway elevation views of further implementations of the channel mounting sensor of FIG. 4.
Figure 8:
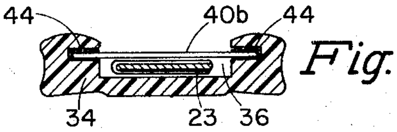

The sensor 23 and facing 40 can be supported in the associated channel member 34 in several different ways. Referring to FIG. 7 the facing 40*a* is bonded to an outer jacket 42 of sensor 23 such as by a double-sided adhesive tape, with facing 40*a* being freely supported within grooves 38 and 39, and sensor 23 being freely supported within channel 36. The sensor and the associated facing are thus free to slide within channel 36 to permit coiling and uncoiling of member 34 during shipment and installation. An alternative mounting arrangement is illustrated in FIG. 8 wherein the facing 40*b* is bonded within grooves 38 and 39 by means of a resilient material 44 such as silicone rubber. The sensor 23 is freely disposed within channel 36 and in this instance is not cemented to the facing 40*b*. During coiling and uncoiling, the sensor is free to move within channel 36 to accommodate the coiling movement. The facing 40*b* since it is secured within grooves 38 and 39 must be sufficiently flexible to permit such coiling. This embodiment offers the advantage of a facing which is sealed to the associated member 34 to prevent transmission of dirt or particles from a working medium into the channel interior. The sensor 21 is thereby well isolated from the working environment.

Figure 9:
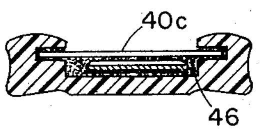

In FIG. 9 a resilient material 46, such as silicone rubber, is employed to bond sensor 23 within channel 36 and also to bond facing 40*c* to sensor 23 and within grooves 38 and 39. This latter embodiment is not as easily coilable as the embodiments of FIGS. 7 and 8, however, it offers the advantage of eliminating any internal voids within member 34 and is thus completely immune to the migration of particles or liquid from a medium in which the sensor is disposed.

Figure 5:
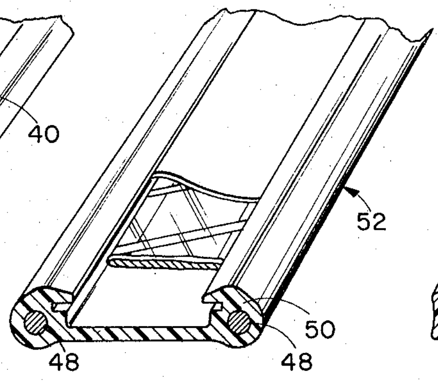
FIGS. 5 and 6 are cutaway pictorial views of alternative embodiments of the channel mounted sensor of FIG. 4.
Figure 6:
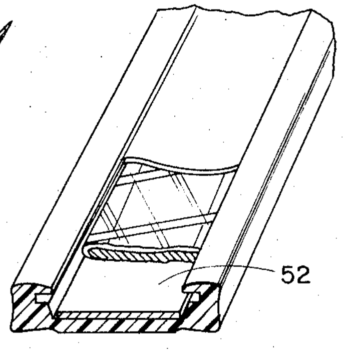

The channel mount 34 and facing 40 can be implemented with a variety of materials to suit particular operating requirements. Generally channel 34 is of high tensile strength and of a non-sticking surface characteristic to allow for the free flow of material along the length thereof and thereby minimize applied frictional forces. In those instances where higher tensile strength is required than is readily achieved with an extruded plastic material, the embodiment of FIG. 5 can be employed wherein a pair of wire ropes 48 are provided each disposed within a respective shoulder portion 50 of channel member 52. Tensile strength can also be enhanced by use of a metal strip 52, shown in FIG. 6, disposed within the bottom surface of channel 36.

Figure 10:
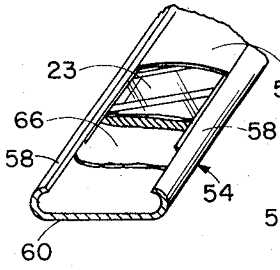
FIGS. 10 and 11 are cutaway pictorial views of a still further channel mounted sensor according to the invention.
Figure 11:
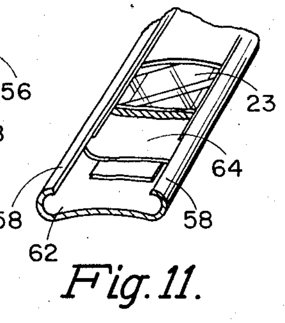

A further channel mounting configuration according to the invention is illustrated in FIGS. 10 and 11 wherein a channel member 54 is contoured to accommodate the sensor 23 and a facing strip 56 within a package configuration of cross-section only slightly larger than that of the sensor itself. The member 54 can be formed of a metal which can be swaged around sensor 23 and associated facing 56, or which can be preformed to the desired shape with the sensor later inserted therein and facing 56 snapped into position beneath shoulder portions 58. Member 54 can have a flat back surface 60, such as depicted in FIG. 10, or an inwardly curved back surface 62, as shown in FIG. 11, which serves to maintain by the spring action of surface 62, sensor 23 in positive engagement with the shoulder portions 58. The sensor can be secured to member 54 by a double sided adhesive tape 64 shown in FIG. 11, or can be maintained within the channel by means of a resilient layer 66 (FIG. 10) disposed around the shoulder portions and back surface of sensor 21.

Figure 12:
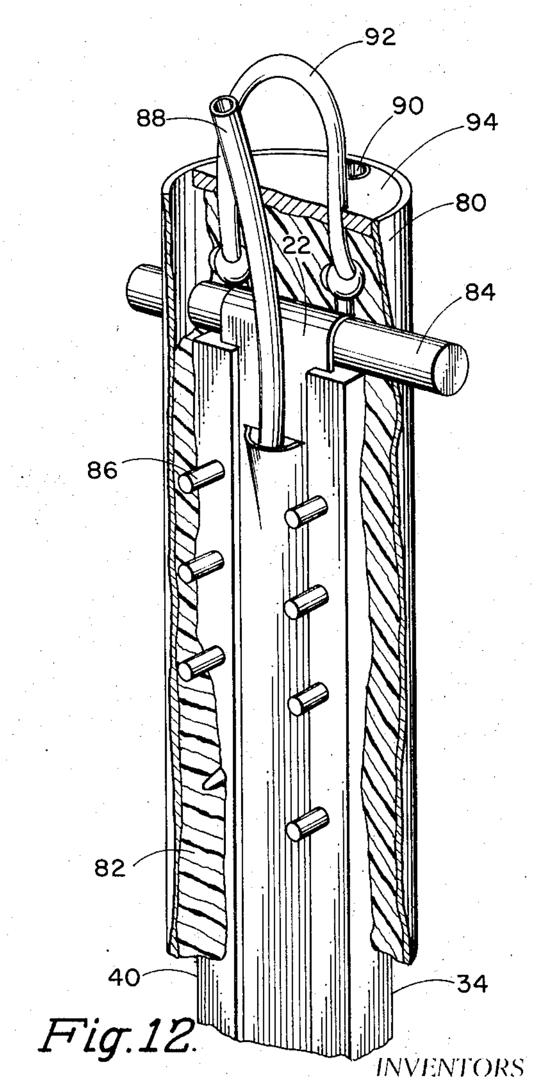
FIG. 12 is a cutaway pictorial view of a typical mounting arrangement for a channel mounted sensor according to the invention.

The sensor is typically mounted within a storage vessel by suspension from the vessel roof by means of a mounting assembly secured to the upper end of the sensor. A typical mounting assembly is depicted in FIG. 12 and includes a cylindrical sleeve 80 formed of a suitable material such as a phenolic resin and surrounding the channel mount, the sensor rigidly secured therein by means of an encapsulant 82 such as a fiberglass reinforced epoxy. A pin 84 is disposed transversely through the upper portion of sleeve 80 and extends outwardly therefrom to serve as a mounting pin cooperative with a mounting plate to permit vertical disposition of the sensor within a storage vessel. The base strip 22 of the sensor is wrapped around pin 84 and extends downwardly within sleeve 80 along the back surface of member 34. The sensor is thus rigidly secured by means of the base strip and the encapsulant 82. A plurality of pins 86 are provided through respective opposite sides of member 34 as illustrated and extend outwardly of the front and back sides thereof to anchor member 34 and the associated sensor within the encapsulant. The facing 40 is secured in place by means of the encapsulant 82 and if desirable can be further secured by passage of pins 86 through the edges thereof. A breathing tube 88 has one end disposed within the jacket 32 of the sensor to provide means for expelling air from the sensor interior in the presence of a surrounding fluent material. A tube 90 is axially arranged through sleeve 80 to provide communication between the storage vessel and the working atmosphere. A rope 92 is provided through the upper cap 94 of sleeve 80 and is secured within the encapsulant typically by means of knotted ends to serve as a support handle for sensor installation.

Figures 13, 14:
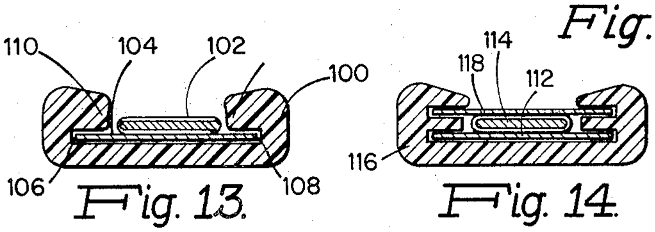
FIGS. 13 and 14 are cutaway pictorial views of further alternative embodiments of the invention.

A separate facing strip is not necessary for all puposes; for example, within a liquid environment, a facing is often not required. A further embodiment of the invention is illustrated in FIG. 13 wherein the outer jacket of the sensor serves as the force transmitting diaphragm. An elongated channel shaped member 100 contains a sensor 102 disposed within the channel therein. The sensor is secured to channel 100 by means of an elongated strip 104 bonded to the sensor 102 such as by a suitable adhesive and contained within grooves 106 and 108 provided as illustrated within the channel. The grooves in this embodiment are adjacent the bottom surface of channel 100, with strip 104 being disposed along the bottom surface of the channel and secured along its respective edges by the grooves 106 and 108. The channel 100 and strip 104 can again be of any suitable material that provides the necessary mechanical strength and coilability. Typically, strip 104 can be of Mylar. The protective portions 110 confronting the respective edges of sensor 102 are of a height to provide intended mechanical protection without detracting from sensor actuation. In certain level sensing applications, for example in sensing the level of dry material having a relatively low bulk density, it is preferable that the active face of sensor 102 be fully exposed to the surrounding material, with portions 110 having an upper surface generally within the plane of the sensitive surface of sensor 102.

In the embodiment of FIG. 14, a rear facing 112 is employed to retain sensor 114 within protective channel member 116, with a front facing 118 serving as the actuating surface. The sensor 114 is typically bonded by a suitable adhesive to the confronting surface of facing 112. Since the sensor is retained within member 116 by facing 112, the front facing 118 can be of extremely light gauge to provide very sensitive transmission of an actuating force. This latter embodiment is useful, for example, in very light dry powders and liquids.

It will be appreciated that the invention can be variously implemented to suit specific requirements. For example, a variety of materials can be employed for the channel and facing members in accordance with particular characteristics desired, and different mounting means can be provided to suit a specific installation. The sensor itself can utilize a conductive helically wound wire around a resistive base strip, rather than the converse construction illustrated. Moreover, the invention can also be employed in a continuous position monitoring system such as described in copending application Ser. No. 884,598 of the assignee herein now U.S. Pat. No. 3,663,881. Accordingly, it is not intended to limit the invention by what has been particularly shown and described except as indicated in the appended claims.

What is claimed is:

1. An elongated spatially continuous sensor structure comprising a sensor including:

an electrically conductive base strip;

an insulative material partially surrounding said base strip to define a sensitive side having an uninsulated opening along the length of one side of said base strip;

a wire helically wound around the insulated base strip, the portions of the wire bridging the uninsulated opening being adapted to contact respective exposed confronting portions of the base strip in the presence of surrounding pressure;

a flexible jacket surrounding said insulated base strip and said helical wire, and being sensitive to surrounding pressure;

at least one of said base strip and said helical wire being resistive;

said base strip and said helical wire being adapted for connection to monitoring circuitry; and an elongated structural member adapted to contain said sensor and including:

a channel along the length of said structural member having a surface supporting said sensor on a side opposite said uninsulated opening;

said sensor being movably disposed in said channel to permit relative movement between said sensor and said structural member along the length thereof;

first and second portions along the length of said structural member and upstanding from said surface and defining said channel;

first and second lip portions formed on said respective first and second portions along respective edges thereof removed from said channel surface and extending toward each other to define a distance therebetween;

first and second confronting grooves in said respective first and second portions at a position in predetermined spaced relation to said channel surface; and an elongated facing disposed for relative movement in said confronting grooves, said facing in the absence of surrounding pressure being in planar disposition closely adjacent the sensitive side of said sensor, and in the presence of surrounding pressure being deformable into engagement with the sensitive side of said sensor to cause the actuation thereof;

said structural member and sensor contained therein being coilable.

2. The sensor structure according to claim 1 including first and second wire ropes each disposed in a respective one of said first and second portions.

3. The sensor structure according to claim 1 wherein a portion of said flexible jacket confronting said facing is bonded thereto, said facing being freely disposed in said confronting grooves.

4. The sensor structure according to claim 1 wherein said sensor is freely disposed in such channel, and said facing is resilienty bonded in such confronting grooves.

5. The sensor structure according to claim 1 wherein said sensor is resiliently bonded in said channel and said facing is resiliently bonded in said confronting grooves.

6. An elongated spatially continuous sensor structure comprising a sensor including:

an electrically conductive base strip;

an elongated continuous element substantially coextensive with said base strip;

means for maintaining said base strip in normally spaced relationship with said element along the length of one side of said base strip defining a sensitive side;

a flexible jacket surrounding said base strip and said element and being sensitive to surrounding pressure;

at least one of said base strip and said element being resistive;

means for connecting said base strip and said element to monitoring circuitry; and an elongated structural member cooperative with said sensor and including:

a channel along the length of said structural member having a surface supporting said sensor on a side opposite the sensitive side thereof, said sensor being disposed in said channel for relative movement therein along the length of said channel;

first and second portions along the length of said structural member and upstanding from said surface and defining said channel;

first and second lip portions formed on said respective first and second portions along respective edges thereof removed from said channel surface and extending toward each other to define a predetermined distance therebetween;

first and second confronting grooves in said respective first and second portions at a position in predetermined spaced relation to said channel surface;

an elongated facing disposed for relative movement in said confronting grooves, said facing in the absence of surrounding pressure being in planar disposition closely adjacent the sensitive side of said sensor, and in the presence of surrounding pressure being deformable into engagement with the sensitive side of said sensor to cause the actuation thereof; and an elongated support strip disposed on said channel surface for relative movement along the length thereof;

said sensor being supported by said support strip for relative movement thereon along the length of said channel.

7. An elongated spatially continuous sensor structure comprising a sensor including:

an electrically conductive base strip;

an elongated continuous element substantially coextensive with said base strip;

means for maintaining said base strip in normally spaced relationship with said element along the length of one side of said base strip defining a sensitive side;

a flexible jacket surrounding said base strip and said element and being sensitive to surrounding pressure;

at least one of said base strip and said element being resistive;

means for connecting said base strip and said element to monitoring circuitry; and an elongated structural member cooperative with said sensor and including:

first and second portions along the length of said structural member and upstanding therefrom to define a channel along the length of said structural member having an elongated flat support surface;

first and second lip portions formed on said respective first and second portions along respective edges thereof removed from said channel surface and extending toward each other to define a predetermined distance therebetween;

first and second confronting grooves in said respective first and second portions at a position in predetermined spaced relation to said support surface; and an elongated support strip disposed on said support surface and in said confronting grooves for relative movement along the length of and with respect to said grooves and said support surface;

the flexible jacket of said sensor being attached on a side opposite the sensitive side of said sensor to said support strip to maintain said sensor within said channel with the sensitive side thereof in predetermined spaced relation to said lip portions.

8. The sensor structure according to claim 7 including:

third and fourth confronting grooves in said respective first and second portions at a position closely adjacent to the sensitive side of said sensor contained in said channel; and an elongated facing disposed for relative movement in said third and fourth confronting grooves, said facing in the absence of surrounding pressure being in planar disposition closely adjacent the sensitive side of said sensor; and in the presence of surrounding pressure being deformable into engagement with the sensitive side of said sensor to cause the actuation thereof.

* * * * *